United States Patent [19]

Abe et al.

[11] Patent Number: 4,625,874

[45] Date of Patent: Dec. 2, 1986

[54] ROTARY RACK STOCK

[75] Inventors: Masatoshi Abe, Yokohama; Tatsuo Kaise, Yokosuka, both of Japan

[73] Assignee: Okamura Corporation, Japan

[21] Appl. No.: 754,391

[22] Filed: Jul. 12, 1985

[30] Foreign Application Priority Data

Jul. 16, 1984 [JP] Japan .................................. 59-146114

[51] Int. Cl.4 ............................................... A47F 5/02
[52] U.S. Cl. ...................................... 211/122; 211/1.5
[58] Field of Search ........................ 211/122, 121, 1.5;
312/134, 97; 198/799, 836

[56] References Cited

U.S. PATENT DOCUMENTS

| 2,899,072 | 8/1959 | Weiss | 211/122 X |
| 3,039,614 | 6/1962 | Rutkovsky et al. | 211/1.5 |
| 3,780,852 | 12/1973 | Weiss et al. | 211/122 |
| 4,531,789 | 7/1985 | Iemura | 211/122 X |

Primary Examiner—Robert W. Gibson, Jr.
Attorney, Agent, or Firm—Ostrolenk, Faber, Gerb & Soffen

[57] ABSTRACT

A rotary stock rack in which a plurality of racks having wheels at the underside thereof are connected with one another in endless series by means of connecting links, and the plurality of racks are adapted to reversely travel on an elliptic orbit along the outer periphery of a frame body in which rotary cradles support the racks on semi-circular portions of the frame body.

4 Claims, 8 Drawing Figures

ROTARY RACK STOCK

BACKGROUND OF THE INVENTION

The present invention relates to a one stage type rotary rack stock comprising a plurality of racks which can detect and pick up articles in the plurality of racks automatically by moving the plurality of racks in which articles are accommodated circularly.

PRIOR ART

Figure 8:
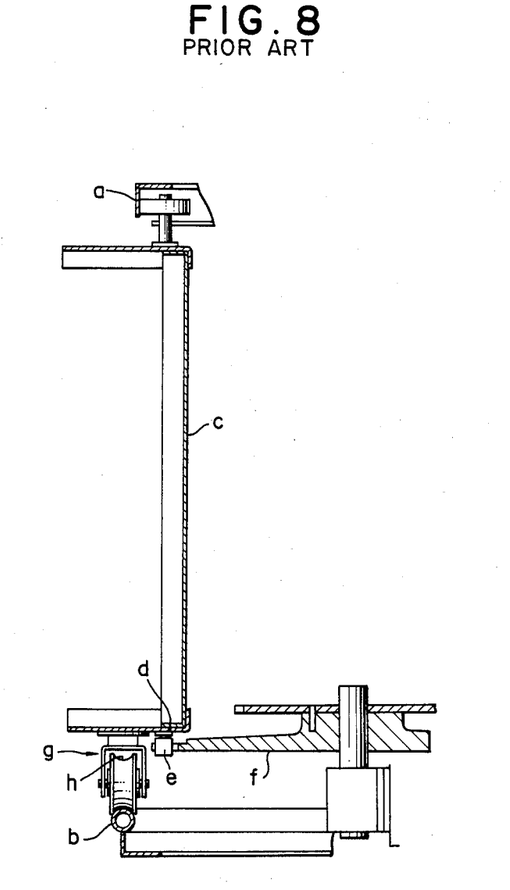
FIG. 8 is a partially broken longitudinally sectional view of the conventional rotary rack stock.

One of examples of this kind of one stage type rotary rack has been disclosed in the Japanese patent publication No. 51-26707. In the one stage rotary rack stock of this kind there are provided, as shown in FIG. 8, a plurality of racks (c) movably between an endless guiding rail (a) mounted on the upper portion and a tubular rail (b) having a circular section, each of driving pins (e) which serves as an axis of respective connecting links of each of the racks engages with a sprocket (f) connected with driving means and by being revolved together with the sprocket (f), the plurality of racks (c) endlessly connected with one another are adapted to travel along the guiding rail (a).

In addition, each of the racks (c) has a pair of wheels (g) at the lower portion thereof, and each of them has a groove (h) with which each of the wheels (g) can ride on the tubular rail (b) so that movement of the racks may be regulated.

However, in the rotary rack stock of the type above described construction, when each of the racks of the rotary rack stock is being traveled on each of end portions among an elliptic orbit, that is, in the case when it is being at each of semi-circularly configured turning portions of the orbit, between the orbit of the racks (c) and a traveling orbit of the wheels (g) there occurs discrepancy, and especially, the smaller radius of rotation becomes, the greater this discrepancy becomes.

Because of the above described reason there are disadvantages in the above mentioned conventional type rotary rack stock that an excessive load is liable to occur at the portion where the sprocket (f) which drives the racks (c) engages with the driving pins (e) of the racks (c), an apprehension of occurring such an accident as damaging the sprocket by dint of concentration of forces applied thereon is still remained etc. further, there is another disadvantage that since the wheels (g) are compulsorily traveled along the tubular rail (b), creaks are also liable to be generated.

SUMMARY OF THE INVENTION

An object of the present invention is to provide a rotary rack stock in which rotary cradles on which racks can be mounted are disposed at semi-circular portions of an elliptic traveling orbit for the racks, so that the racks thereon can be smoothly transported.

The rotary rack stock according to the present invention has the following construction, that is, it comprises a plurality of racks having wheels undersides thereof being connected with one another endlessly in series by means of connecting links, and the plurality of racks being adapted to turningly travel along the outer round of a frame body on the elliptic orbit composed of linear portions and semi-circular portions, and is characterized in that rotary cradles which support the racks on the semi-circular portions of the frame body and are reversibly movable according to the semi-circular orbit.

DESCRIPTION OF THE PREFERRED EMBODIMENTS

The present invention will be described minutely by referring to a preferred embodiment shown in the accompanying drawings.

The reference number (1) indicates fixed plates or base plates disposed in parallel with each other having an interval therebetween, and on these base plates (1) there is erected a frame body (2) of a rectangular parallelepiped shape.

The frame body (2) comprises a plurality of floor rods (3) directed to the front and rear direction and disposed in parallel with each other having an interval in lateral direction therebetween, struts (4) erected at the front and the rear end portions of the floor rods (3), ceiling rods (5) supported on the upper surfaces of the struts (4)(4) and projecting into the front and rear direction of the struts (4) with desired length and guiding rails (6)(6) of rectangular channel shape which direct downwardly secured in parallel with each other to the underside surface of the ceiling rods (5) at the front and the rear ends.

A pair of roller guides (7)(7) of which material and shape are same as those of the guiding rails (6)(6) but direct upwardly are secured between the lower ends of the outer sides of the struts (4) through a fitting plate (8) so as to oppose to the guiding rails (6)(6). Between each front end surface and rear end surface of the floor rods (3) there are laid orbits (9)(9) which are composed of angular tubes.

Figure 5:
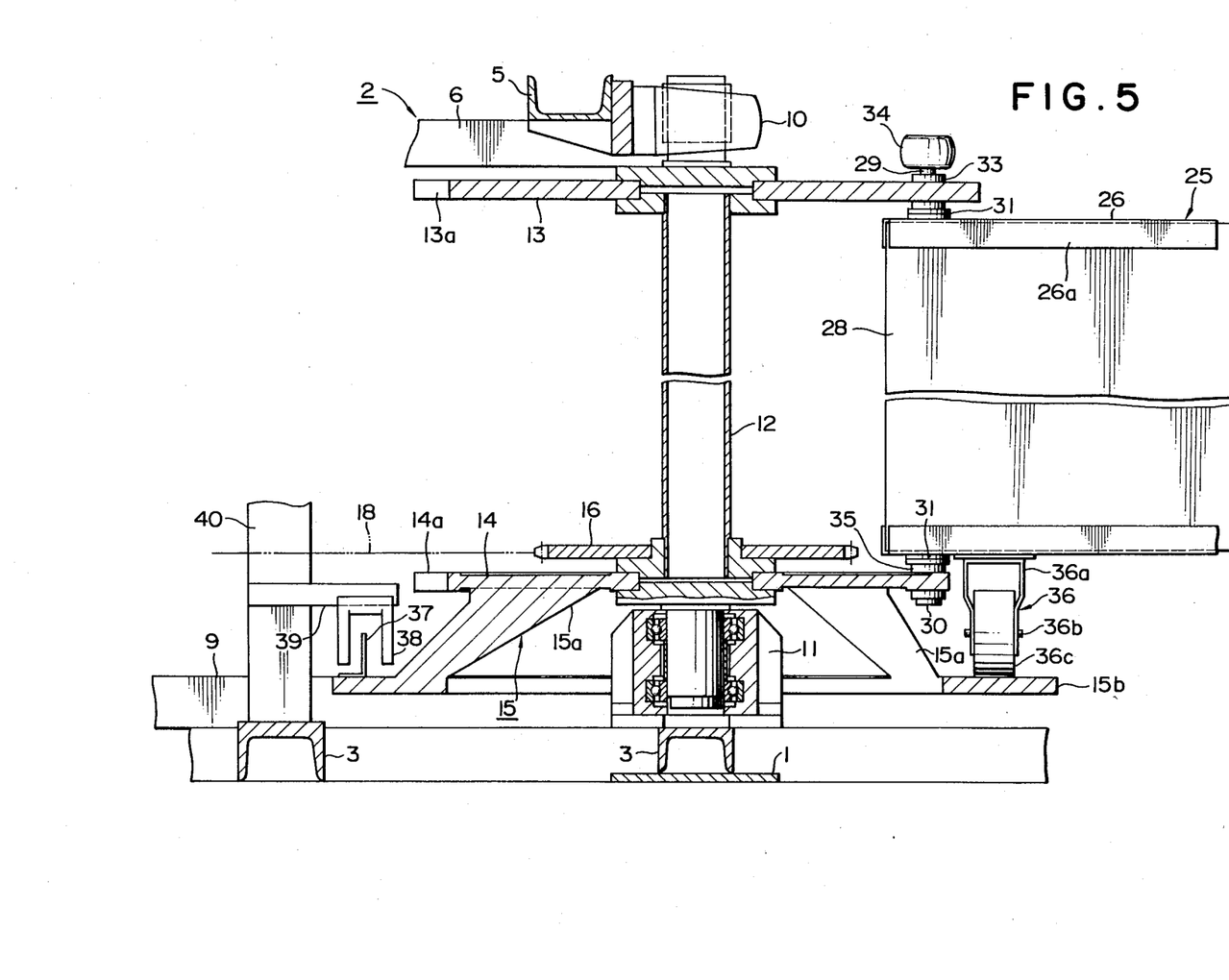
FIG. 5 is a longitudinal sectional view cut along v—v line in FIG. 1.

As shown in FIG. 5, a vertical bearing (10) is mounted at the central portion of the ceiling rod (5) positioned at the right end of the frame body (2), and on the base plate (1) which is opposite to the bearing (10) a vertical thrust bearing (11) is mounted, and on both of them a rotational axis (12) is erected rotatably about the vertical axis (10).

A rotary plate (13) having six recessed portions (13a) separated with an equidistance from each other on the outer peripheral surface thereof and each of which has an outwardly opened notch of an angle of 60 is secured on the outer periphery of the upper end portion of the rotational axis (12).

At the outer periphery of the lower portion of the rotational axis (12) there are mounted a rotary plate (14) oppositely disposed to the rotary plate (13) and having six recessed portions (14a) having the same shape as those of the rotary plate (13), and a rotary cradle (15)

disposed at the underside thereof and comprising a plurality of ribs each of which extends radially in the aslantly downward direction and has a horizontal ring portion (15b) supported at the tip end of each of said ribs (15a).

On the outer periphery of the rotational axis (12) at the upper portion of the cradle (15), there is secured a sprocket (16) of small diameter for connecting with a chain, and between the sprocket (16) and a driving means, that is, a sprocket of a motor (17) mounted on the frame body (2) an endless chain (18) is bridged. Between a vertical bearing (19) mounted on the ceiling rod (5) at the left end portion of the frame body (2) and a vertical thrust bearing (20) a rotational axis (21) is rotatably erected.

A follower rotary plate (22) having the same shape as that of the afore-mentioned rotary plate (13) is mounted on the upper portion of the rotational axis (21), and a rotary cradle (24) on the upper surface of which a plurality of rotary plates (23) are disposed is mounted rotatably integrally with them.

Figure 3:
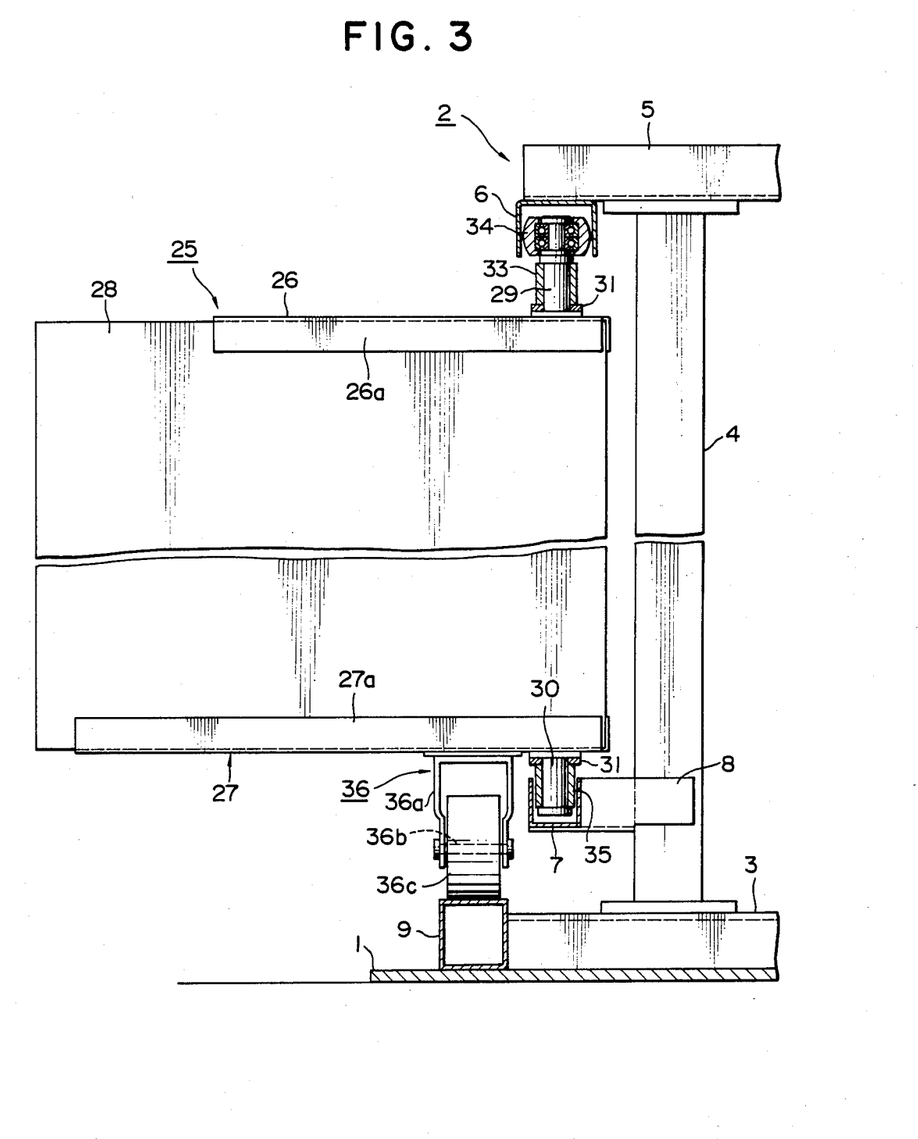
FIG. 3 is a longitudinal sectional view cut along iii—iii line in FIG. 1.

The reference number (25) indicates a rack. It comprises, as shown in FIG. 3, a ceiling plate (26) on which three pieces (26a) which are drooped from three edge portions in the different directions except the front edge portion are mounted, a bottom plate (27) on which three raising walls (27a) are erected at the rear part and the both sides except the front part thereof, and a shelf unit (28) of a rectangular shape inserted vertically between these ceiling and bottom plates (26),(27) and the rear end.

On the rear upper portion of the ceiling plate (26) a pair of axes (29) which serve also as a pair of driving pins by having a predetermined pitch (P) are erected, and to the bottom plate (27) a pair of axes (30) having the same predetermined pitch (P) are also erectingly provided.

Figure 4:
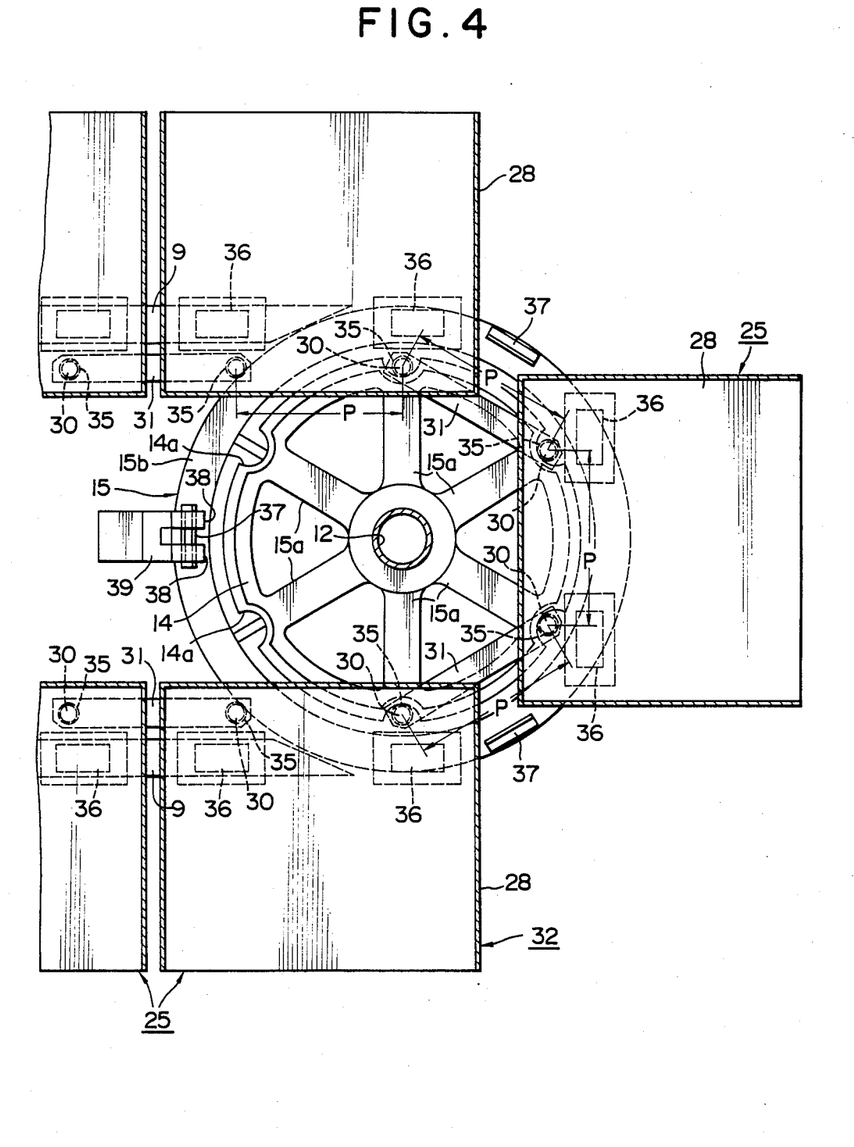
FIG. 4 is a cross sectional view cut along iv—iv line in FIG. 2.

As shown in FIG. 4, said respective axes (29) and (30) of the adjacent racks (25)(25) oppositely erected with each other are connected with one another having the predetermined pitch (P) by means of a connecting link (31) having a penetrating hole at both ends thereof, thus each of these racks (25) and each of the connecting links (31) are connected endlessly so that an endless rotary shelf (32) may be formed.

In addition, a tubular roller (33) which engages detachably with said recessed portions (13a) (14a) is rotatably provided on the intermediate part of the outer periphery of each of the axes (29). A guiding portion, i.e., a horizontal roller (34) is provided on the outer periphery of the upper end portion of each of the axes (29). Quite same as the afore-mentioned, on the outer periphery of each of the axes (30) a tubular guiding portion, i.e., a roller (35) is rotatably provided.

On the underside surface slightly nearer to the front side of the bottom plate (27) than the axes (30) there are secured a pair of wheels (36) comprising a bracket (36a) of downwardly opened channel like shape, a shaft (36b) which penetrates both side walls of the opened portion of the bracket (36a) and a vertical roller (36c) pivotally mounted on the shaft (36b).

Each of the wheels (36) of the outer racks (25) is mounted freely movably on the orbit (9) at linear portions of the front and the rear parts of the frame body (2), each of the rollers (35) is inserted into the roller guides (7) so that it may freely roll therein, and because each of the horizontal rollers (34) being inserted into the guiding rails, each of the wheels (36) is vertically supported.

Each of the wheels (36) is mounted on the horizontal ring portions (15b)(24b), as shown in FIG. 5, at the both end portions of the frame body (2), and the lower roller (35) engages with each of the recessed portions (14a) of the rotary plate (14). In addition, the upper roller (33) engages with each of the recessed portions (13a) of the upper rotary plate (13).

Figure 1:
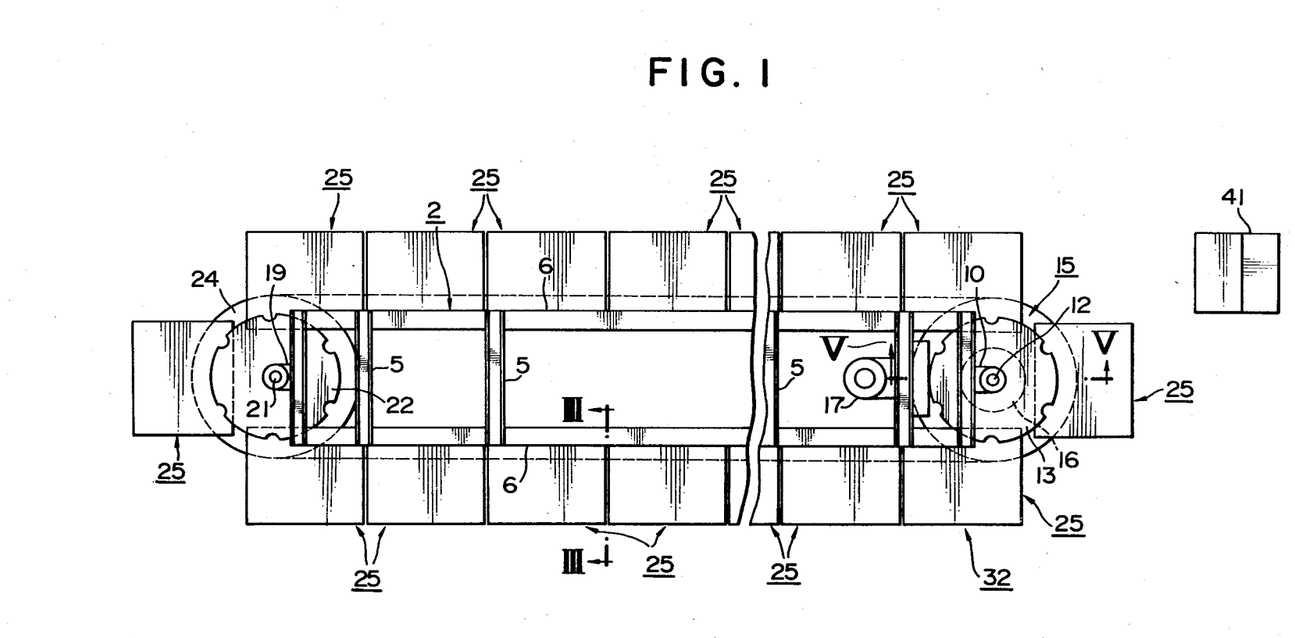
FIG. 1 is a partially broken flat view of an embodiment of the present invention.
Figure 2:
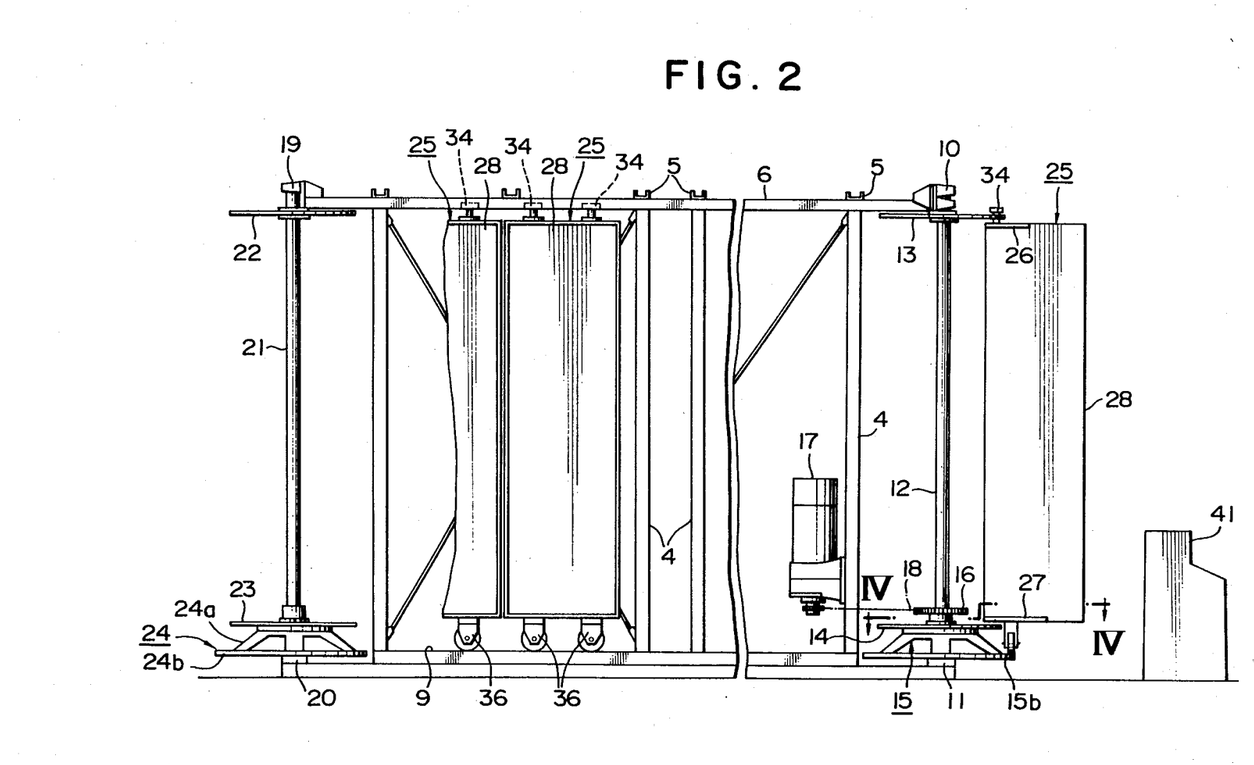
FIG. 2 is an elevation view of the rotary rack stock shown in FIG. 1 from which most of the racks have been removed.

Thus, the endless rotary shelf (32) is appeared, when it is seen from the above, as shown in FIG. 1, an elliptic shape which comprises linear portions at the front and the rear portions and two semi-circular portions at left and right end portions, and is wound around the frame body (2).

Nextly, hereinafter description will be given regarding a rack positioning means for stopping a desired rack at a picking up position, i.e., the right side of the frame body (2).

As shown in FIG. 4, on the horizontal ring portion (15b) of the rotary cradle (15) there are disposed three projecting pieces (37) separated angularly with one another (in the present embodiment the separating angle being 120 degree) and each having L shaped section.

A pair of transparent type photoelectric tubes (38)(38) having downwardly opened channel shape are secured to a strut (40) erected at the center of the floor rod (3) positioned in the left hand side of the rotational axis (12) shown in FIG. 5 by means of a fitting plate (39) so that the tubes (38)(38) may stride a circular orbit which is drawn as an orbit of rotation of the projecting pieces (37). In the present invention it is adapted that when lights coming from those photoelectric tubes (38)(38) are interrupted by a tongue piece (37), a rack (25) which corresponds to the tongue piece (37) is brought to the right side of the frame body (2), that is, the picking position. The reference number (39) in FIG. 1 indicates a control panel which is mounted at the right side of the frame body (2) except for the frame body (2). By the control panel speed of revolution of the motor (17) and detection of the rack, i.e., positioning of the rack to be stopped can be performed by utilizing a computer.

Hereinafter, description of operation of the rotary rack stock constructed as the above mentioned will be given.

As the addresses of the racks (25) are previously registered in the control panel (41), when a number of the rack (25) now being at the picking gate is input to the control panel (41), any desired rack (25) can be brought to the right side of the frame body (2). When the motor is revolved, the endless rotary shelf (32) which engages with both the rotary plates (13) and (14) is revolved in the clockwise direction or in the counter-clockwise direction.

At the linear portions of both the front and the rear part of the frame body (2), the vertical rollers (36c) of the wheels (36) roll on the orbit (9) and on the upper portion of the racks (25) the horizontal rollers (34) roll in the guiding rails (6). Quite same as the afore-mentioned, at the lower portion of the racks (25) the rollers (35) roll in the roller guides (7). Thus, the racks (25) are traveled in vertically standing condition.

As shown in FIG. 4, in the semi-circular portion at the right side, each of rollers (35) of the respective racks (25) is engaged with each of the recessed portions (13a) and (14a) sequentially, and according to rotation of the rotary axis (12), the wheel (36) rolls from the right end of the orbit (9) to the horizontal ring portion (15b) of the rotary cradle (15). Each of the racks (25) mounted on the cradle (15) in a stationary state is moved around the outer periphery of the semi-circular portion of the rotary plates (13) and (14), after the wheel (36) has ridden on the rear side of the orbit (9), it travels on the orbit (9) again. Same as the above described, at the semi-circular portion in the left end side of the frame body (2), each of the racks (25) mounted on each of the horizontal ring (24b) of the rotary cradle (24) is again traveled after having been moved on the orbit (9).

When the desired rack (25) reaches the picking gate, as shown in FIG. 4, at the state that the tongue piece (37) is between the photoelectric tubes (38), rotation of the motor (17) stops and the opening part of the rack (25) is to precisely direct to the picking gate.

Figure 6:
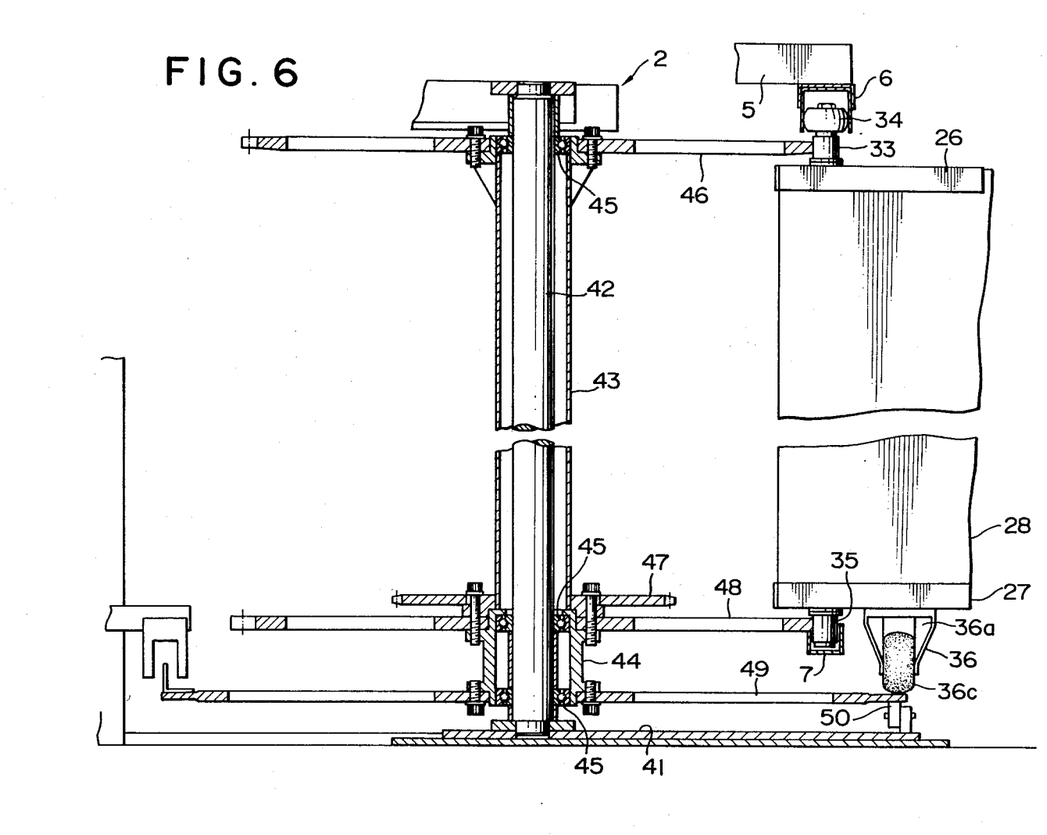
FIG. 6 is a longitudinal sectional view of another example of the present invention shown in FIG. 5.
Figure 7:
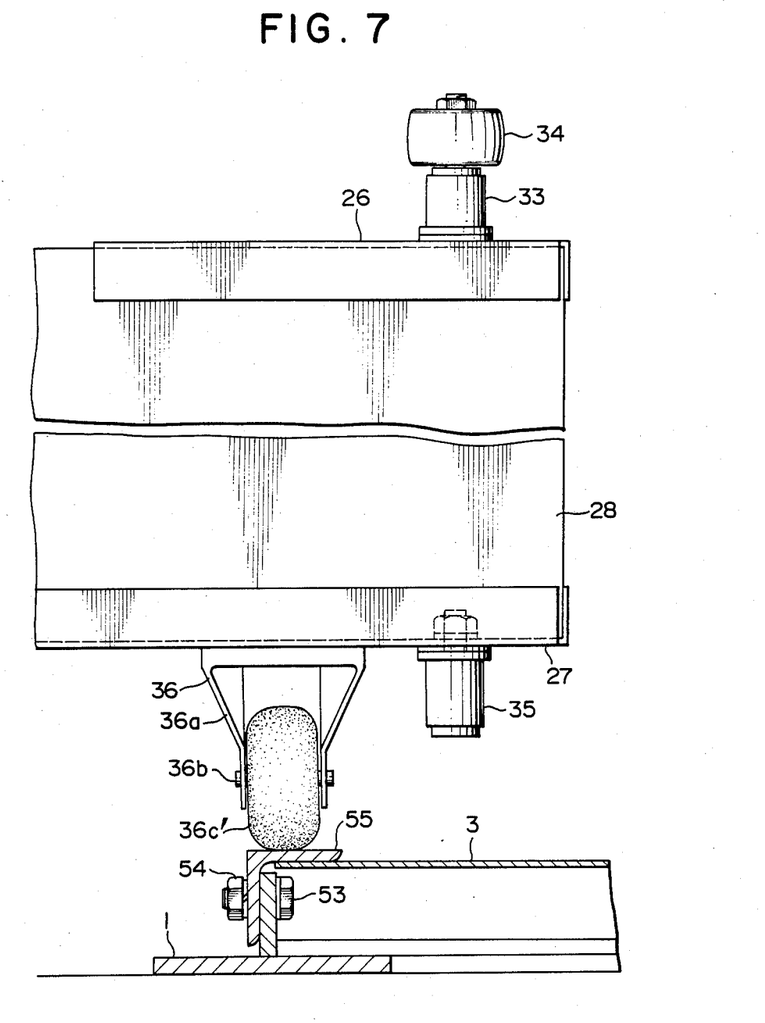
FIG. 7 is a longitudinal sectional view of another example of the present invention shown in FIG. 3.

FIGS. 6 and 7 show another embodiment in which a supporting construction of the rotary cradle (15) and a wheel are different from those of shown in FIG. 1, that is, the supporting construction of the cradle (15) and the wheel (36) in the first embodiment. However, hereinafter descriptions are given therefor by marking same numbers to the same members.

A pair of integrally connected a longer and a shorter tubular bodies (43) and (44) are rotatably inserted into each of longitudinal axes (42) supported its upper end portion by the frame body (2) and its lower end on a floor plate (41) and erected on the floor plate (41).

On the longer tubular body (43) inserted into the upper part of the longitudinal axis (42) a ring shaped rotary plate (46) and a sprocket (47) are secured respectively to the outer peripheries of the upper and the lower end portions horizontally. To the outer periphery of the upper end portion of the shorter tubular body (44) which is inserted into the lower end portion of the longitudinal axis (42) a ring shaped rotary plate (48) is secured horizontally, and also a ring shaped rotary plate (49) is secured horizontally to the outer periphery of the lower end portion of the shorter tubular body (44). As afore-mentioned, the rotary cradle is constructed.

The underside near the outer edge of the rotary plate (49) is supported by a plurality of vertical rollers (50) appropriately provided on the floor plates (41) at the semi-circular portion of the frame body (2).

With the above mentioned simple construction, rigidity of the rotary cradle is increased and manufacture of the same becomes facile.

In FIG. 7 there is shown the wheel (36) to which a vertical roller (36') having substantially elliptic section along the shaft thereof is attached instead of the vertical roller (36c) of the wheel (36) of the first embodiment. By making all edge portion of the roller to curved surfaces, sliding resistance generated at the case when the wheel (36) is going to ride on the rotary cradle (15) becomes small. Further, if a channel member (55) having an L shaped cross section which is bolted with a bolt (53) and a nut (50) to the floor material (3) is used, as shown in FIG. 7, instead of the orbit (9) having a rectangular channel shape of the first embodiment, it is also possible to reduce manufacturing cost.

In the embodiments the rack is mounted on the rotary cradle through its wheel, however, it is also possible to construct the present invention so that the bottom plate of the rack may be supported by the rotary cradle. Further, the rotary cradle has been integrally made with the rotary plates, however, of course, it is possible to construct it so that the bottom plate of the rack may support the cradle. It is also possible to provide the rotary plate and the rotary cradle arranged vertically parallel with each other on the rotational axis.

In the embodiment it is adapted that the wheel rolls on the orbit made of rectangular tube, however, as having been shown in the conventional example, at the linear portion of the frame body a tubular rail(s) may be equipped to travel pulleys on the tubular rail(s). In this case there is another advantage that the roller guides (7) of the lower portion of the frame body having been shown in the embodiment can be omitted. In the embodiment it is also adapted that the roller is inserted into the axis projecting upwardly and downwardly from the rack so that the roller may engage with the recessed portions of the rotary plates, however, it is also possible to eliminate the roller and immediately engage the axis with the rotary plate.

As minutely described heretofore, the rotary rack stock according to the present invention is constructed that rotary cradles which integrally rotate with a pair of rotary plates to which endless chain of the rotary shelf is wound, and two rotary cradles which mount the racks of the endless rotary shelf and convey them on the semi-circular orbit are provided on the both end portions of the frame body, so that no excessive load can be burdened to the rotary plates even at the semi-circular reversing portions of the orbit. Further, even in the case when the racks are traveled on the orbit with their wheels equipped underside portions thereof, the wheels do not roll on the rotary cradles, so that in comparison with the construction in which the wheels of the racks roll on the semi-circular orbit, in the former no excessive force is added, which results in lengthening durable lives of the wheels and preventing creak from occurrence.

What is claimed is:

1. A rotary stock rack, comprising:
    a frame body comprised of an upper guide and a coextensive parallel lower roller guide disposed below the upper guide, the upper and the lower guides being shaped for defining two parallel linear portions, and two semicircular portions at the ends of said linear portions wherein said linear and said semicircular portions define an elliptical path;
    a plurality of racks extending between said upper guide and said lower guide, and arranged around said linear and said semicircular portions; connecting links connecting said racks to each other in an endless serial fashion;
    a rotary cradle disposed adjacent each said semicircular portion for supporting said racks thereon at said semicircular portion and for enabling movement of said plurality of racks along said elliptical path;
    each said rack having at least one roller which is disposed at said rotary cradle as said rack passes over said cradle for allowing said plurality of racks to travel along said semicircular portions of said elliptical path; and
    means separate from said cradle for engaging said racks for moving them along said elliptical path.

2. A rotary rack stock defined in claim 1, wherein each of said rotary cradles is provided with a horizontal ring portion on a part thereof which bears the wheels of said respective racks.

3. A rotary stock rack as defined in claim 1, further comprising means separate from and rotatable with said rotary cradles at said semicircular portions for engaging and rotating said racks around said semicircular portions, while said racks ride on said rotary cradle.

4. A rotary stock rack as defined in claim 3, wherein said rotary cradles are completely circular in shape and rotate with respect to said linear portions, and said linear portions are separate from said rotary cradles; said linear portions being positioned so that a roller moving from said semicircular portion to said linear portion will move off said rotary cradles onto said linear portions and ride therealong, and vice versa.

* * * * *